United States Patent
Chen et al.

(10) Patent No.: US 10,333,343 B2
(45) Date of Patent: Jun. 25, 2019

(54) UNINTERRUPTIBLE POWER SYSTEM, CONTROL APPARATUS OF THE SAME AND METHOD OF CONTROLLING THE SAME

(71) Applicant: DELTA ELECTRONICS, INC., Taoyuan (TW)

(72) Inventors: Tien-He Chen, Taoyuan (TW); Chiao-Chien Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 333 days.

(21) Appl. No.: 15/407,587

(22) Filed: Jan. 17, 2017

(65) Prior Publication Data
US 2017/0373532 A1   Dec. 28, 2017

(30) Foreign Application Priority Data
Jun. 23, 2016   (TW) .............................. 105119685 A (51) Int. Cl.
*H02J 9/06*   (2006.01)

(52) U.S. Cl.
CPC ......... *H02J 9/062* (2013.01); *H02J 2009/068* (2013.01)

(58) Field of Classification Search
CPC ............................ H02J 9/062; H02J 2009/068
See application file for complete search history.

(56) References Cited

U.S. PATENT DOCUMENTS

| 2003/0053323 | A1* | 3/2003 | Kimura | H02M 7/53875 363/98 |
| 2012/0306274 | A1* | 12/2012 | Shetler, Jr. | H02J 9/062 307/64 |
| 2015/0311750 | A1* | 10/2015 | Hui Jung | H02J 9/062 307/66 |

* cited by examiner

*Primary Examiner* — Jeffrey M Shin
(74) *Attorney, Agent, or Firm* — Hauptman Ham, LLP (57) ABSTRACT

An uninterruptible power system includes a power conversion apparatus, a switch unit and a control apparatus. The switch unit outputs a mains voltage in a line mode, and output an alternating conversion voltage in a battery mode. The control apparatus is configured to generate a base triangular wave signal according to the mains voltage. When the uninterruptible power system is in a battery mode and the control apparatus detects the regeneration of the mains voltage, the control apparatus is configured to determine whether a cross-over value of the base triangular wave signal is within a predetermined range when the mains voltage is at a zero-cross point. The control apparatus is configured to control the switch unit to output the mains voltage instead of the alternating conversion voltage when the cross-over value of the base triangular wave signal is within the predetermined range.

34 Claims, 9 Drawing Sheets

UNINTERRUPTIBLE POWER SYSTEM, CONTROL APPARATUS OF THE SAME AND METHOD OF CONTROLLING THE SAME

BACKGROUND OF THE INVENTION

Field of the Invention

The present invention relates to an uninterruptible power system, a control apparatus for uninterruptible power system and method for uninterruptible power system, especially to an off-line square wave uninterruptible power supply, a control apparatus for off-line square wave uninterruptible power system and method for off-line square wave uninterruptible power system.

Description of Prior Art

As the progress of society, the demand for quality of power supply is higher. To ensure the safety of electric utility, the uninterruptible power system is popular design trend. The off-line uninterruptible power system is attractive and has extensive application due to the advantages of compact size, light weight and low price.

Figure 1:
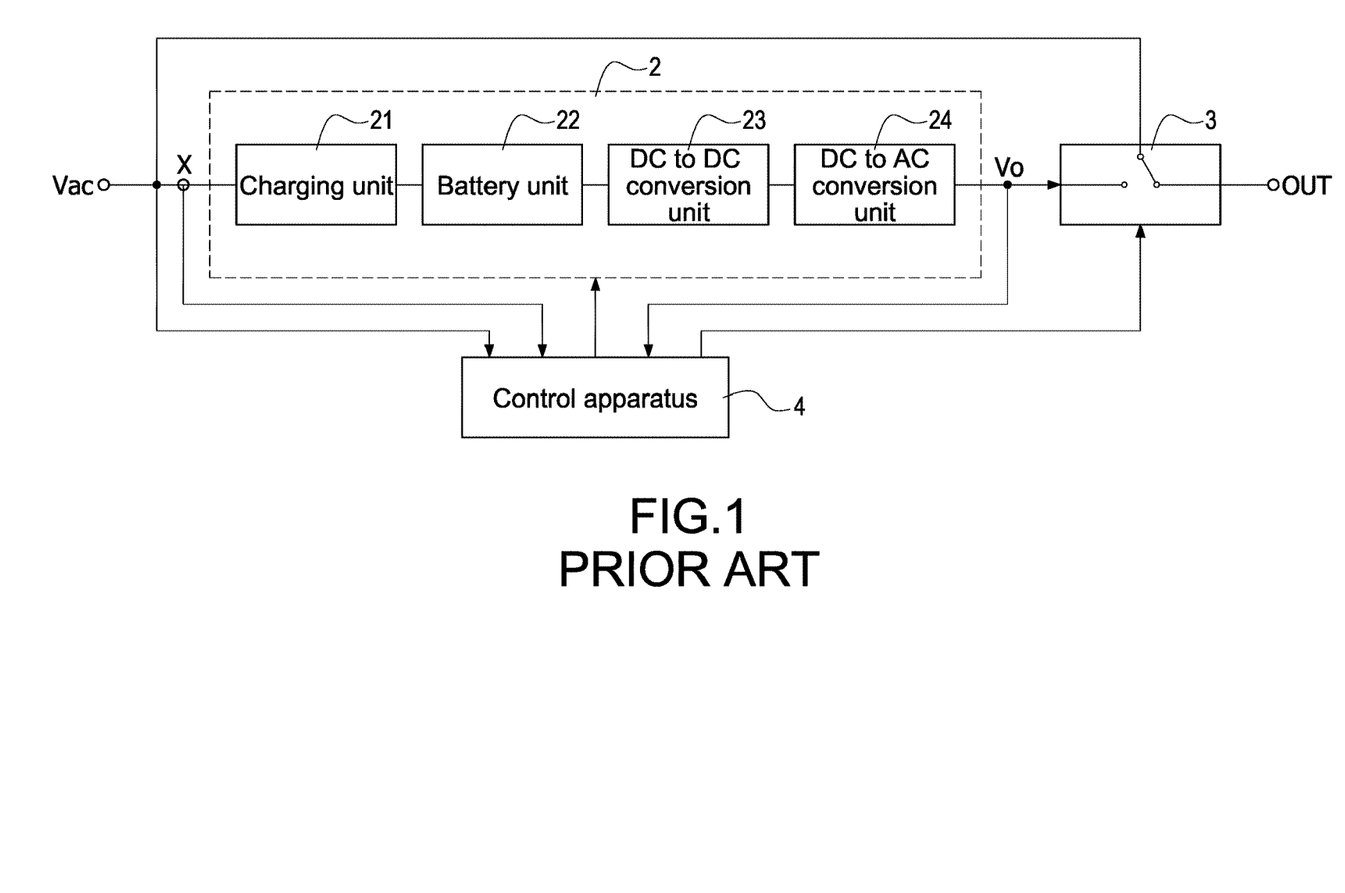
FIG. 1 shows a block diagram of a prior art off-line uninterruptible power system.

FIG. 1 shows a block diagram of a prior art off-line uninterruptible power system. The off-line uninterruptible power system mainly comprises a power conversion apparatus 2 receiving a mains voltage Vac and outputting an alternating conversion voltage Vo, a switch unit 3 receiving the mains voltage Vac and the alternating conversion voltage Vo, a control apparatus 4 configured to sense the mains voltage Vac and the alternating conversion voltage Vo and to control the power conversion apparatus 2 and the switch unit 3. The power conversion apparatus 2 comprises a charging unit 21 electrically connected with a battery unit 22, a DC to DC conversion unit 23 electrically connected with the battery unit 22 and a DC to AC conversion unit 24. When the mains voltage Vac is normal, the mains voltage Vac is outputted to a load (not shown) through the switch unit 3 and charges the battery unit 22 in the power conversion apparatus 2. When the control apparatus 4 detects that the mains voltage Vac is interrupted or the mains voltage Vac is abnormal at a detection point X, the battery unit 22 supplies the alternating conversion voltage Vo to the switch unit 3 through the DC to DC conversion unit 23 and the DC to AC conversion unit 24. The switch unit 3 then outputs the alternating conversion voltage Vo to the load.

The alternating conversion voltage Vo outputted by the above mentioned off-line uninterruptible power system may have waveform of square wave or sinusoidal wave. The former one is popular due to versatility and cost consideration. However, the above mentioned off-line uninterruptible power system has following drawbacks:

1. The above mentioned off-line uninterruptible power system has risk of instantaneous short circuit because it lacks the phase locking function between the mains voltage Vac and the power conversion apparatus 2.

2. The actual switching time of the switch unit 3 has a delay time with the command issuing time of the control apparatus. The switch unit 3 may be damaged by excessive switching stress because the switch unit 3 has above delay time and fails to achieve switching at zero crossing point of the mains voltage.

It is desirable to provide an uninterruptible power system, a control apparatus and method for the power conversion apparatus, which utilizes the phase locking function to prevent from instantaneous short circuit problem and damaging of switch unit due to excessive switching stress.

SUMMARY OF THE INVENTION

According to one aspect of the present invention, the present invention provides an uninterruptible power system operable in a line mode or a battery mode, the uninterruptible power system comprising: a power conversion apparatus configured to receive a mains voltage and generate an alternating conversion voltage; a switch unit configured to receive the mains voltage and the alternating conversion voltage, and to output the mains voltage in the line mode and output the alternating conversion voltage in the battery mode; and a control apparatus configured to sense the mains voltage and the alternating conversion voltage, and control the power conversion apparatus and the switch unit, wherein the control apparatus is further configured to generate a base triangular wave signal according to the mains voltage in the line mode and determine whether a cross-over value of the base triangular wave signal is within a predetermined range at a zero-crossing point of the mains voltage when the uninterruptible power system is operating in the battery mode and the mains voltage resumes; and wherein the control apparatus is further configured to control the switch unit to output the mains voltage instead of the alternating conversion voltage and change the uninterruptible power system from operating in the battery mode to operating in the line mode when the cross-over value of the base triangular wave signal is within the predetermined range at the zero-crossing point of the mains voltage.

According to one embodiment, the control apparatus is configured to adjust a frequency of the base triangular wave signal when the control apparatus determines that the cross-over value of the base triangular wave signal is not within a predetermined range at the zero-crossing point of the mains voltage. The control apparatus is configured to decrease the frequency of the base triangular wave signal when the base triangular wave signal has falling edge and the cross-over value of the base triangular wave signal is smaller than the predetermined range at the zero-crossing point of the mains voltage. The control apparatus is configured to increase the frequency of the base triangular wave signal when the base triangular wave signal has falling edge and the cross-over value of the base triangular wave signal is larger than the predetermined range at the zero-crossing point of the mains voltage.

According to another embodiment, the predetermined range is comprised of a tolerance range from a middle value of the base triangular wave signal; the tolerance value is 10% of the absolute value of the peak-to-valley voltage of the base triangular wave signal.

According to still another embodiment, in the line mode, the control apparatus is configured to generate the base triangular wave signal with middle values corresponding to rising-edge zero-crossing points and falling-edge zero-crossing points of the mains voltage, wherein the control apparatus is configured to control the power conversion apparatus to output the alternating conversion voltage having same frequencies, peaks and valleys as the mains voltage when the uninterruptible power system changes from the line mode to the battery mode.

According to still another embodiment, the control apparatus comprises a carrier controller configured to receive the mains voltage and generate the base triangular wave signal and a switch triggering signal, a pulse controller configured to receive the alternating conversion voltage and the switch triggering signal and output a pulse width modulation (PWM) signal and a switch control signal, wherein the power conversion apparatus is controllable by the PMW signal and the switch unit is controllable by the switch control signal.

According to still another embodiment, the pulse controller further comprises: a feedback controller configured to receive the alternating conversion voltage and output a conversion control voltage signal, a pulse width modulation (PWM) unit configured to receive the base triangular wave signal and the conversion control voltage signal and generate the PWM signal, wherein the PWM unit outputs the PWM signal in the battery mode.

According to still another embodiment, the carrier controller further comprise a mains sensing unit configured to receive the mains voltage and generate a mains zero-crossing signal according to the mains zero-crossing point of the mains voltage, a carrier generator configured to receive the mains zero-crossing signal and output the base triangular wave signal, a base triangular wave voltage sampling unit configured to receive the base triangular wave signal and output a sampling voltage value, and a determination unit configured to receive the mains zero-crossing signal and output a determination signal to the carrier generator and output the switch triggering signal, wherein the determination unit is configured to determine whether the cross-over value of the base triangular wave signal is within the predetermined range at zero-crossing point of the mains voltage.

According to still another embodiment, the carrier generator further comprises a frequency adjusting unit configured to receive the determination signal and output a frequency adjusting signal, and a carrier count resetting unit configured to receive the mains zero-crossing signal and the frequency adjusting signal and output the base triangular wave signal, wherein the frequency adjusting unit is configured to adjust a frequency of the base triangular wave signal according to the determination signal when the uninterruptible power system changes from the battery mode to the line mode.

According to still another embodiment, the pulse controller further comprises a switch controller configured to receive the switch triggering signal and generate a switch control signal for controlling the switch unit. The switch controller further comprises a switch delay time table; the switch delay time table provides a delay time according to a type of the switch unit, the switch controller switches the switch unit with reference to the delay time when the uninterruptible power system changes from the battery mode to the line mode.

According to another aspect of the present invention, the present invention provides a control apparatus for an uninterruptible power system operated in a line mode or a battery mode, the control apparatus comprising: a carrier controller for receiving a mains voltage and generating a base triangular wave signal and a switch triggering signal; and a pulse controller for receiving an alternating conversion voltage output from a power conversion apparatus and receiving the switch triggering signal, the pulse controller being configured to generate a pulse width modulation (PWM) signal for controlling the power conversion apparatus and generating a switch control signal for controlling a switch unit, wherein the control apparatus generates the base triangular wave signal according to the mains voltage in the line mode; wherein the control apparatus is configured to determine if a cross-over value of the base triangular wave signal is within a predetermined range at a zero-crossing point of the mains voltage when the uninterruptible power system is operated in the battery mode and the mains voltage resumes, and wherein the control apparatus is further configured to control the switch unit to output the mains voltage instead of the alternating conversion voltage when the cross-over value of the base triangular wave signal is within the predetermined range at the zero-crossing point of the mains voltage.

According to still another aspect of the present invention, the present invention provides a method of controlling an uninterruptible power system, the method comprising: (a) providing the uninterruptible power system operable in a line mode or a battery mode; (b) receiving a mains voltage by the uninterruptible power system operating in the line mode; (c) generating a base triangular wave signal according to the mains voltage; (d) generating an alternating conversion voltage according to the mains voltage; (e) operating the uninterruptible power system in the battery mode and outputting the alternating conversion voltage; (f) receiving a resumed mains voltage by the uninterruptible power system; (g) determining if a cross-over value of the base triangular wave signal is within a predetermined range at a zero-crossing point of the resumed mains voltage; and (h) outputting the resumed mains voltage instead of the alternating conversion voltage when the cross-over value of the base triangular wave signal is within the predetermined range at zero-crossing point of the resumed mains voltage.

BRIEF DESCRIPTION OF DRAWING

One or more embodiments of the present disclosure are illustrated by way of example in the figures of the accompanying drawings, in which like references indicate similar elements. These drawings are not necessarily drawn to scale.

DETAILED DESCRIPTION OF THE INVENTION

Figure 2:
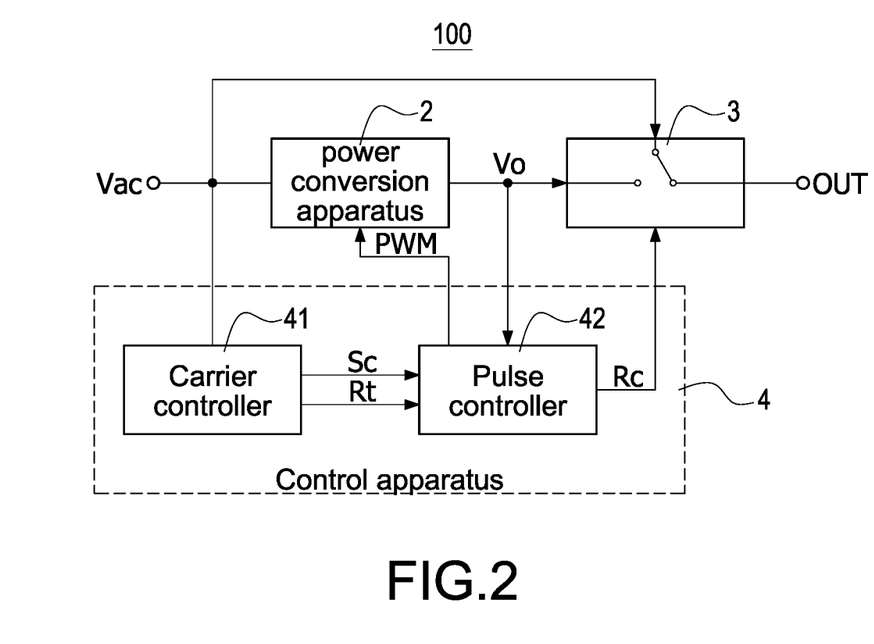
FIG. 2 shows a block diagram of an uninterruptible power system according to an embodiment of the present invention.

Referring to FIG. 2, the uninterruptible power system 100 can be operated in a line mode LM or a battery mode BM, and receives a mains voltage Vac. When the mains voltage Vac has normal frequency and normal root means square (RMS) value, the uninterruptible power system 100 operates in the line mode. When the mains voltage Vac is abnormal or fails, the uninterruptible power system 100 operates in the battery mode. As shown in FIG. 2, the uninterruptible power system 100 comprises a power conversion apparatus 2 for receiving the mains voltage Vac and outputting an alternating conversion voltage Vo, a switch unit 3 for receiving the mains voltage Vac and the alternating conversion voltage Vo. The switch unit 3 outputs the mains voltage Vac in the line mode LM and outputs the alternating conversion voltage Vo in the battery mode BM. The switch unit 3 may be implemented by, but is not limited to, a double pole double throw relay. The uninterruptible power system 100 further comprises a control apparatus 4 configured to sense the mains voltage Vac and the alternating conversion voltage Vo and to control the power conversion apparatus 2 and the switch unit 3. The control apparatus 4 further comprises a carrier controller 41 for receiving the mains voltage Vac and then generating a base triangular wave signal Sc and a switch triggering signal Rt. The control apparatus 4 further comprises a pulse controller 42 for receiving the alternating conversion voltage Vo, the base triangular wave signal Sc and the switch triggering signal Rt, and outputting a pulse width modulation signal PWM and a switch control signal Rc. The pulse width modulation signal PWM is used to control the power conversion apparatus 2, and the switch control signal Rc is used to control the switch unit 3.

Figure 3:
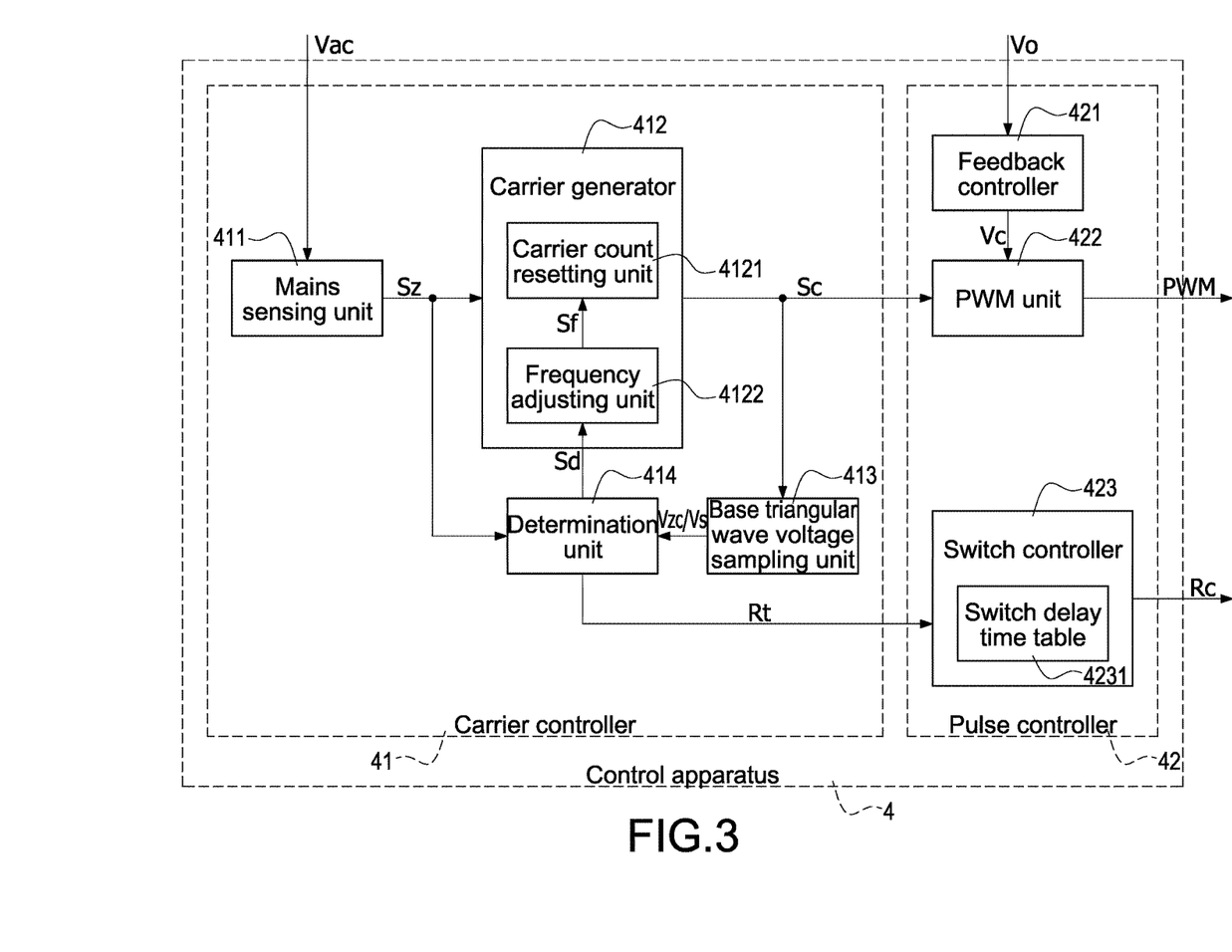
FIG. 3 shows an internal block diagram of a control apparatus.

FIG. 3 shows an internal block diagram of the control apparatus 4. With reference also to FIG. 2, the carrier controller 41 further comprises a mains sensing unit 411 for receiving the mains voltage Vac and generating a mains zero-crossing signal Sz according to a mains zero-crossing point zc of the mains voltage Vac; and a carrier generator 412 for receiving the mains zero-crossing signal Sz and outputting the base triangular wave signal Sc. The carrier controller 41 further comprises a base triangular wave voltage sampling unit 413 for receiving the base triangular wave signal Sc and recording (generating) a sampling voltage value Vs; a determination unit 414 for receiving the mains zero-crossing signal Sz and the sampling voltage value Vs, outputting a determination signal Sd to the carrier generator 412, and outputting the switch triggering signal Rt. The carrier generator 412 further comprises a frequency adjusting unit 4122 for receiving the determination signal Sd and outputting a frequency adjusting signal Sf; and a carrier count resetting unit 4121 for receiving the mains zero-crossing signal Sz and the frequency adjusting signal Sf and outputting the base triangular wave signal Sc. The detailed operation and determination method for the control apparatus 4 and the determination unit 414 is described later in this specification.

With reference to FIG. 3 and also to FIG. 2, the pulse controller 42 further comprises a feedback controller 421 for receiving the alternating conversion voltage Vo and outputting a conversion control voltage signal Vc, a pulse width modulation (PWM) unit 422 for receiving the base triangular wave signal Sc and the conversion control voltage signal Vc, and outputting the pulse width modulation signal PWM, The pulse controller 42 further comprises a switch controller 423 for receiving the switch triggering signal Rt and outputting the switch control signal Rc for controlling the switch unit 3. The switch controller 423 comprises a built-in switch delay time table 4231.

Figure 4:
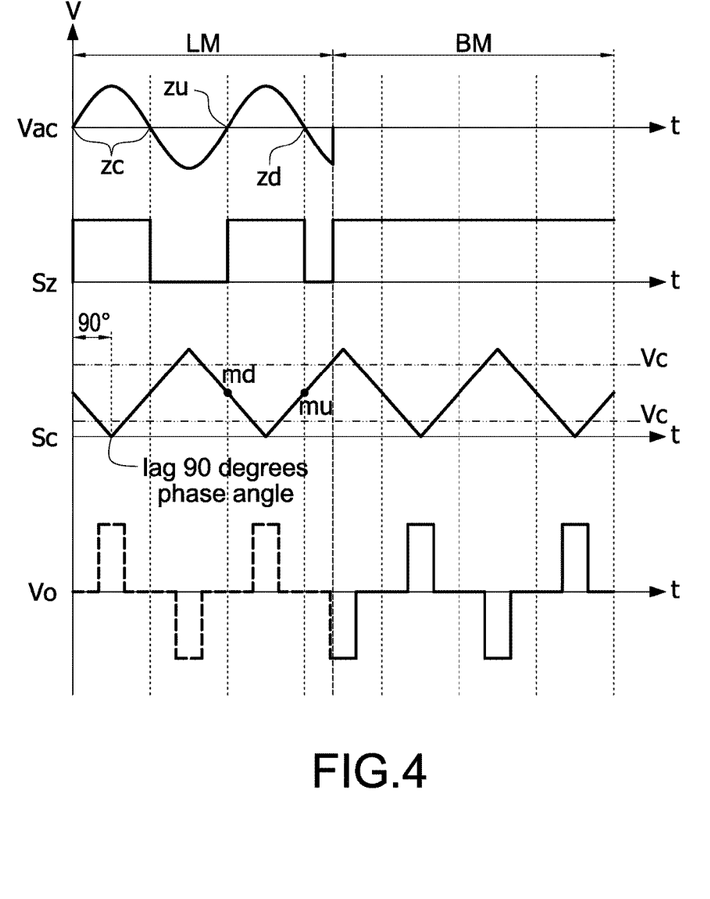
FIG. 4 shows waveforms of an uninterruptible power system in a line mode (LM) and a battery mode (BM), respectively.

Referring to FIG. 4 with reference also to FIGS. 2 and 3, when the mains voltage Vac is present, the uninterruptible power system 100 is operated in the line mode LM. When the mains voltage Vac is not available, the uninterruptible power system 100 is switched from the line mode LM to the battery mode BM. In the line mode LM, the mains sensing unit 411 generates the mains zero-crossing signal Sz according to the mains voltage Vac rising-edge zero-crossing point zu and falling-edge zero-crossing point zd, as shown in FIG. 4. The mains zero-crossing signal Sz is a continuous square wave. The rising edges and the falling edges of the mains zero-crossing signal Sz corresponds to the to the rising-edge zero-crossing points zu and the falling-edge zero-crossing points zd of the mains voltage Vac, respectively.

The carrier generator 412 receives the mains zero-crossing signal Sz and outputs the base triangular wave signal Sc. Shown in FIG. 4, the base triangular wave signal Sc is a continuous triangular signal. The base triangular wave signal Sc is generated such that the rising edges of the mains zero-crossing signal Sz corresponds to the falling edge mid-point and of the base triangular wave signal Sc, and the falling edges of the mains zero-crossing signal Sz corresponds to the rising edge mid-point mu of the base triangular wave signal Sc. Moreover, the control apparatus 4 resets the base triangular wave signal Sc at the time point 90 degrees lag to the rising-edge zero-crossing point zu of the mains voltage Vac. In the line mode LM, the count resetting unit 4121 continually counts and resets the base triangular wave signal Sc such that the alternating conversion voltage Vo can be in phase with the mains voltage Vac when the switch unit 3 switches the uninterruptible power system 100 to the battery mode BM. In the line mode LM, the PWM unit 422 does not output the pulse width modulation signal PWM and the power conversion apparatus 2 does not output the alternating conversion voltage Vo. As indicated by dashed line of the alternating conversion voltage Vo in FIG. 4, there is no alternating conversion voltage Vo in the line mode LM. When the mains voltage Vac is not available or the mains sensing unit 411 detects an abnormal mains voltage, the mains sensing unit 411 generates mains zero-crossing signal Sz with continuous high level as shown in FIG. 4. However, the specific waveform is not a limitation of the present invention and the mains sensing unit 411 can generate mains zero-crossing signal Sz with other kinds of waveforms as long as the control apparatus 4 can identify that the mains voltage is not available or is abnormal.

As shown in FIG. 4, the uninterruptible power system 100 is switched from the line mode LM to the battery mode BM when the mains sensing unit 411 detects that the mains voltage is not available or is abnormal. The count resetting unit 4121 continually performs counting and resetting based on the original base triangular wave signal Sc generated according to the mains voltage Vac. At this time, the PWM unit 422 outputs the pulse width modulation signal PWM according to the base triangular wave signal Sc and the conversion control voltage signal Vc. The pulse width modulation signal PWM is used to control the power conversion apparatus 2 to output the alternating conversion voltage Vo with the same frequencies and the same peak/valley positions as those of the mains voltage Vac to succeed the power supplied by the mains voltage Vac. The determination unit 414 knows the mains voltage Vac being unavailable from the mains sensing unit 411 and outputs the switch triggering signal Rt to the switch controller 423. The switch controller 423 outputs the switch control signal Rc for controlling the switch unit 3 to output the alternating conversion voltage Vo instead of the mains voltage Vac. Moreover, abnormal mains voltage means that the mains voltage Vac has abnormal voltage value or abnormal frequency. In one embodiment, to prevent the control apparatus 4 from erroneous operation caused by noise in the mains voltage Vac, abnormal voltage value means the RMS value of the mains voltage Vac is not in the ranges of 90 Vac~145 Vac and abnormal frequency means the frequency of the mains voltage Vac is not within rated frequency ±5 Hz.

Figure 5A:
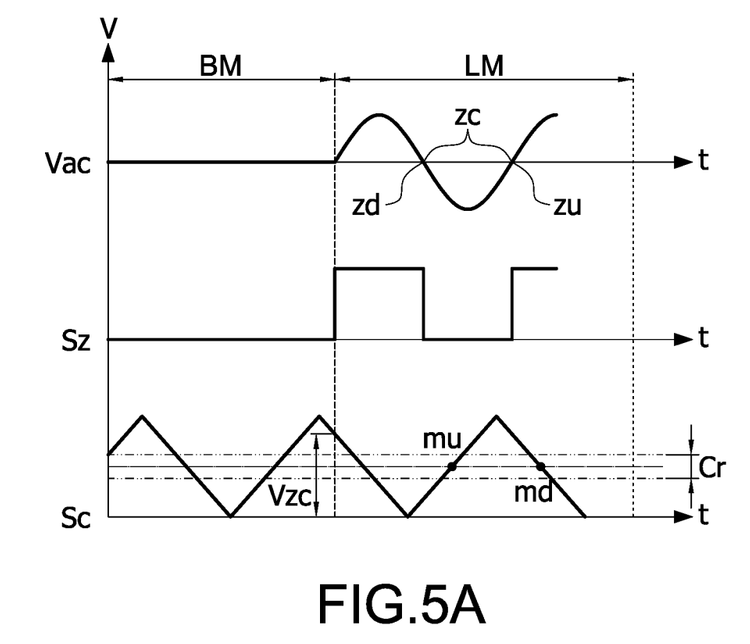
FIG. 5A shows waveforms illustrating a switching timing between the line mode (LM) and the battery mode (BM) for the uninterruptible power system according to an embodiment of the present invention.

Referring to FIG. 5A with reference also to FIGS. 2 and 3, when the mains voltage Vac is not available, the uninterruptible power system 100 is operated in battery mode BM. At this time, the PWM unit 422 outputs the pulse width modulation signal PWM according to the base triangular wave signal Sc and the conversion control voltage signal Vc. The pulse width modulation signal PWM is used to control the power conversion apparatus 2 to output the alternating conversion voltage Vo. When the mains voltage resumes (regenerates), the mains sensing unit 411 sends the mains zero-crossing signal Sz while the base triangular wave voltage sampling unit 413 receives the base triangular wave signal Sc and outputs a sampling voltage value closest to the mains zero-crossing point zc and a cross-over value Vzc, which is the value of the base triangular wave signal Sc at the moment of mains zero-crossing point zc. The determination unit 414 determines whether a slope between the sampling voltage value Vs and the cross-over value Vzc is smaller than zero. The determination unit 414 further determines whether the cross-over value Vzc is within a predetermined range Cr when the slope is smaller than zero. The sampling voltage values Vs are generated by sampling the voltage value of the base triangular wave signal Sc with the sampling period, which is, for example but not limited to, 300 μSec. Moreover, the base triangular wave voltage sampling unit 413 outputs at least one sampling voltage value Vs to the determination unit 414 such that the determination unit 414 can determine the slope of the base triangular wave signal Sc at the zero-crossing point zc of the mains voltage Vac. For example, the base triangular wave voltage sampling unit 413 outputs two sampling voltage values Vs to the determination unit 414 such that the determination unit 414 can determine the slope of the base triangular wave signal Sc at the zero-crossing point zc of the mains voltage Vac more precisely. As shown in FIG. 5A, the transition between the battery mode BM and the line mode LM may be determined by the rising-edge zero-crossing point zu of the mains voltage Vac and the falling edge mid-point and of the base triangular wave signal Sc. However, the actual circuit can be implemented in other ways. Moreover, the transition between the battery mode BM and the line mode LM may also be determined by the falling-edge zero-crossing point zd of the mains voltage Vac and the rising edge mid-point mu of the base triangular wave signal Sc.

Figure 5B:
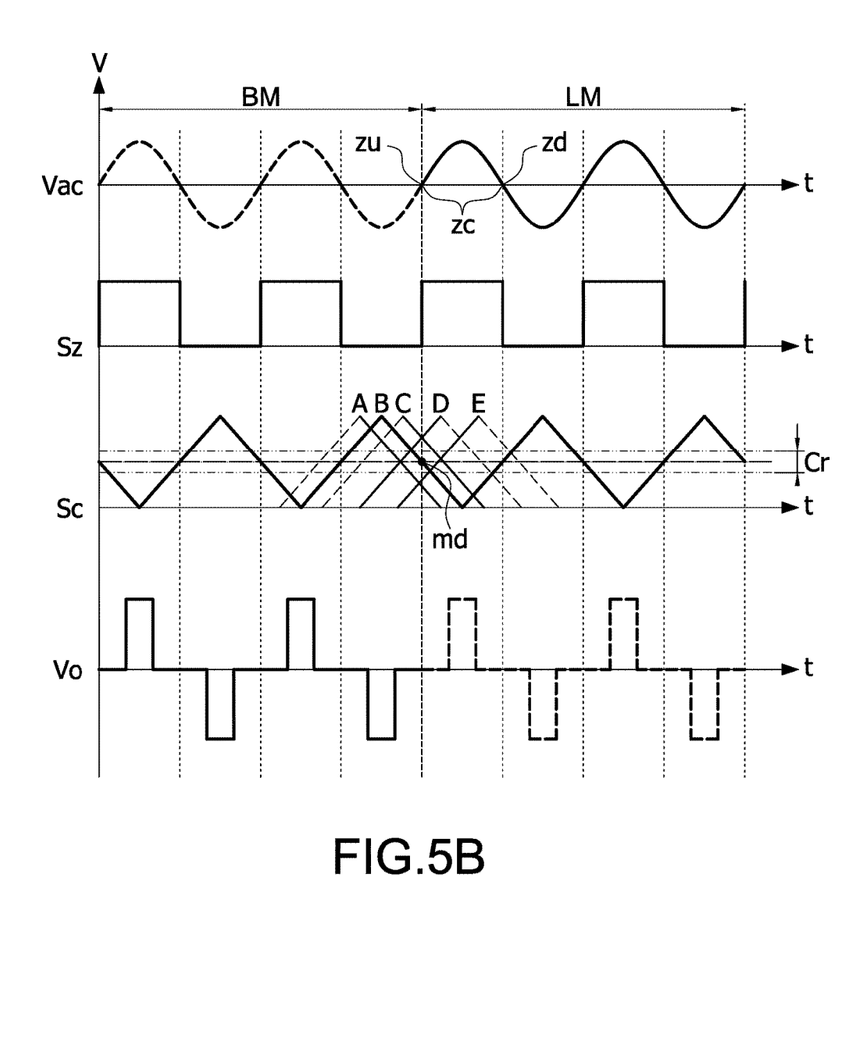
FIG. 5B shows waveforms illustrating the transition between the battery mode (BM) and the line mode (LM).

FIG. 5B shows the waveforms illustrating the transition between the battery mode BM and the line mode LM. With reference also to FIGS. 2 to 4, the operation of the uninterruptible power system of the present invention is illustrated with the first to fifth triangular waves A~E, which have phase differences between each other. The first triangular wave A leads the second triangular wave B, and the third to fifth triangular waves C~E lag the second triangular wave B. As shown in FIG. 5B, the first triangular wave A leads the second triangular wave B and the falling edge mid-point md of the first triangular wave A leads the zero-crossing point zc of the resumed mains voltage Vac. The falling edge mid-point md of the second triangular wave B is within the predetermined range Cr at the zero-crossing point zc of the resumed mains voltage Vac. The third to fifth triangular waves C~E lag the second triangular wave B and the falling edge mid-points md of the third to fifth triangular waves C~E lag the zero-crossing point zc of the resumed mains voltage Vac. After the mains voltage Vac is resumed, if the base triangular wave signal Sc has the waveform of the second triangular wave B (namely, the falling edge mid-point md of the base triangular wave signal Sc is within the predetermined range Cr at the zero-crossing point zc of the resumed mains voltage Vac), the PWM unit stops outputting the PWM signal. At this time, the determination unit 414 generates the switch triggering signal Rt and sends the switch triggering signal Rt to the switch controller 423. The switch controller 423 sends the switch control signal Rc to control the switch unit 3 such that the output of the switch unit 3 is switched from the alternating conversion voltage Vo to the mains voltage Vac. The predetermined range Cr is a tolerance value from a middle value of the base triangular wave signal Sc. The tolerance value may be, for example but not limited to, 10% absolute value of the peak-to-valley voltage of the base triangular wave signal Sc. Moreover, the tolerance value can be smaller for more precise determination, or the tolerance value can be larger for allowing switching with larger zero-crossing error.

With reference to FIG. 5B and further to FIGS. 2 and 3, after the mains voltage Vac is resumed, the mains sensing unit 411 will sense and output the mains zero-crossing signal Sz, while the base triangular wave voltage sampling unit 413 will receive the base triangular wave signal Sc and outputs a sampling voltage value with sampling time closest to the mains zero-crossing point zc. The determination unit 414 determines whether the slope between the sampling voltage value Vs and the cross-over value Vzc is smaller than zero. When the slope is not smaller than zero, the base triangular wave signal may have waveforms as fourth and fifth triangular waves D~E shown in FIG. 5B, and the fourth and fifth triangular waves D~E lags the second triangular wave B. At this time, if the determination unit 414 determines that the cross-over value Vzc is not within the predetermined range Cr, the determination unit 414 sends the determination signal Sd to the frequency adjusting unit 4122, and the frequency adjusting unit 4122 sends the frequency adjusting signal Sf to the carrier count resetting unit 4121 to increase the frequency of the base triangular wave signal Sc. When the slope is smaller than zero, the determination unit 414 determines whether the cross-over value Vzc is within the predetermined range Cr. If the cross-over value Vzc is not within the predetermined range Cr, the base triangular wave signal may have waveforms as first and third triangular waves A, C shown in FIG. 5B. If the falling edge mid-point md of the base triangular wave signal Sc leads the zero-crossing point zc of the resumed mains voltage Vac, the base triangular wave signal Sc may have waveform as the first triangular wave A, which leads the second triangular wave B, and the associated cross-over value Vzc is smaller than the predetermined range Cr. The determination unit 414 sends the determination signal Sd to the frequency adjusting unit 4122, and the frequency adjusting unit 4122 sends the frequency adjusting signal Sf to the carrier count resetting unit 4121 to decrease the frequency of the base triangular wave signal Sc. If the falling edge mid-point md of the base triangular wave signal Sc lags the zero-crossing point zc of the resumed mains voltage, the base triangular wave signal Sc may have waveform as the third triangular wave C, which lags the second triangular wave B. At this time, the associated cross-over value Vzc is larger than the predetermined range Cr. The determination unit 414 sends the determination signal Sd to the frequency adjusting unit 4122, and the frequency adjusting unit 4122 sends the frequency adjusting signal Sf to the carrier count resetting unit 4121 to increase the frequency of the base triangular wave signal Sc.

Figure 6:
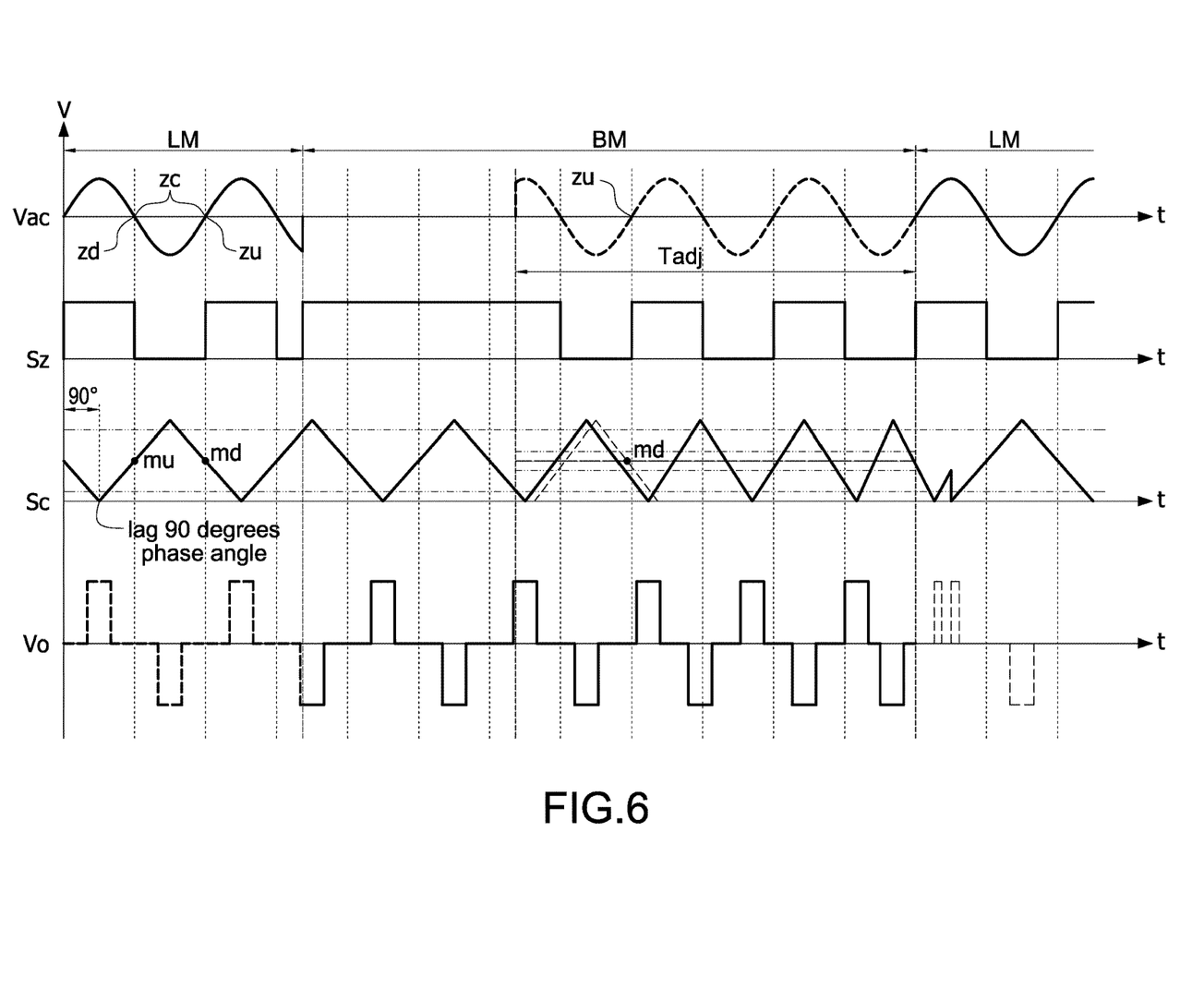
FIG. 6 shows waveforms of the uninterruptible power system switched between the line mode (LM) and the battery mode (BM).

Referring to FIG. 6 with reference also to FIGS. 2 and 3, the uninterruptible power system is switched to the battery mode BM from the line mode LM in a manner similar to that disclosed in FIG. 4, the detailed description is not repeated here for brevity. The transition between the battery mode BM and the line mode LM is determined with reference to the rising-edge zero-crossing point zu of the mains voltage Vac and the falling edge mid-point md of the base triangular wave signal Sc. However, the actual circuit can be implemented in other ways. For example, the transition between the battery mode BM and the line mode LM may be determined with reference to the falling-edge zero-crossing point zd of the mains voltage Vac and the rising edge mid-point mu of the base triangular wave signal Sc. The other examples are not described in further detail for brevity.

As shown in FIG. 6, after the mains voltage is resumed, the uninterruptible power system 100 has a frequency adjusting region Tadj. During the frequency adjusting region Tadj, the uninterruptible power system 100 adjusts the base triangular wave signal Sc such that the falling edge mid-point md of the base triangular wave signal Sc is within the predetermined range Cr at the moment the rising-edge zero-crossing point zu of the mains voltage Vac occurs (namely, at the time of the rising-edge zero-crossing point zu of the mains voltage Vac). When the falling edge mid-point md of the base triangular wave signal Sc is within the predetermined range Cr at the time of the rising-edge zero-crossing point zu, the uninterruptible power system 100 is switched from the battery mode BM to the line mode LM. Simply put, during the frequency adjusting region Tadj, the uninterruptible power system 100 increases or decreases the frequency of the base triangular wave signal Sc. Moreover, with the increment or decrement of the frequency of the base triangular wave signal Sc, the power conversion apparatus 2 also increases or decreases the frequency of the alternating conversion voltage Vo.

As shown in FIG. 6, in the initial period of the frequency adjusting region Tadj, the base triangular wave signal Sc has waveform as the first triangular wave A in FIG. 5B. After the mains power is resumed, the mains sensing unit 411 senses and outputs the mains zero-crossing signal Sz. The base triangular wave voltage sampling unit 413 receives the base triangular wave signal Sc and samples the base triangular wave signal Sc to output the sampling voltage value Vs. The determination unit 414 determines that a slope between the sampling voltage value Vs and the cross-over value Vzc is smaller than zero and the cross-over value Vzc is smaller than the predetermined range Cr (namely, not within the predetermined range Cr). The determination unit 414 sends the determination signal Sd (indicating frequency decrement) to the frequency adjusting unit 4122, and the frequency adjusting unit 4122 sends the frequency adjusting signal Sf to the carrier count resetting unit 4121 to decrease the frequency of the base triangular wave signal Sc. After a plurality of triangular wave signal elapses, the falling edge mid-point and of the base triangular wave signal Sc is within the predetermined range Cr at the time of the rising-edge zero-crossing point zu. The PWM unit 422 stops outputting the PWM signal. At this time, the determination unit 414 generates the switch triggering signal Rt and outputs the switch triggering signal Rt to the switch controller 423. The switch controller 423 sends the switch control signal Rc to the switch unit 3 such that the switch unit 3 switches the output from the alternating conversion voltage Vo to the mains voltage Vac, namely, the uninterruptible power system 100 is switched from battery mode BM to line mode LM. It should be noted the embodiment in FIG. 6 is exemplified with the base triangular wave signal Sc having the waveform as the first triangular wave A in FIG. 5B, but similar adjustments can be applied to base triangular wave signal Sc having the waveforms as the triangular waves C~E in FIG. 5B.

After the uninterruptible power system 100 is switched to line mode LM, the alternating conversion voltage Vo is depicted with dashed line to denote that it is not output. In the line mode LM, the mains sensing unit 411 generates the mains zero-crossing signal Sz according to the rising-edge zero-crossing point zu and the falling-edge zero-crossing point zd of the mains voltage Vac. The mains zero-crossing signal Sz is shown as a continuous square wave. The rising edges and the falling edges of the mains zero-crossing signal Sz corresponds to the to the rising-edge zero-crossing points zu and the falling-edge zero-crossing points zd of the mains voltage Vac, respectively. The carrier generator 412 receives the mains zero-crossing signal Sz and outputs the base triangular wave signal Sc. The base triangular wave signal Sc is a continuous triangular signal. The base triangular wave signal Sc is generated such that the rising edges of the mains zero-crossing signal Sz corresponds to the falling edge mid-point and of the base triangular wave signal Sc, and the falling edges of the mains zero-crossing signal Sz corresponds to the rising edge mid-point mu of the base triangular wave signal Sc. Moreover, the control apparatus 4 resets the base triangular wave signal Sc at the time point 90 degrees lag to the rising-edge zero-crossing point zu of the mains voltage Vac. Therefore, the base triangular wave signal Sc has a small triangular surge after the uninterruptible power system 100 is switched to line mode LM. The carrier count resetting unit 4121 keeps counting and resetting the base triangular wave signal Sc to ensure that the alternating conversion voltage Vo is in phase with the mains voltage Va for when the switch unit 3 switches the operation of the uninterruptible power system 100 to battery mode BM again.

Figure 7:
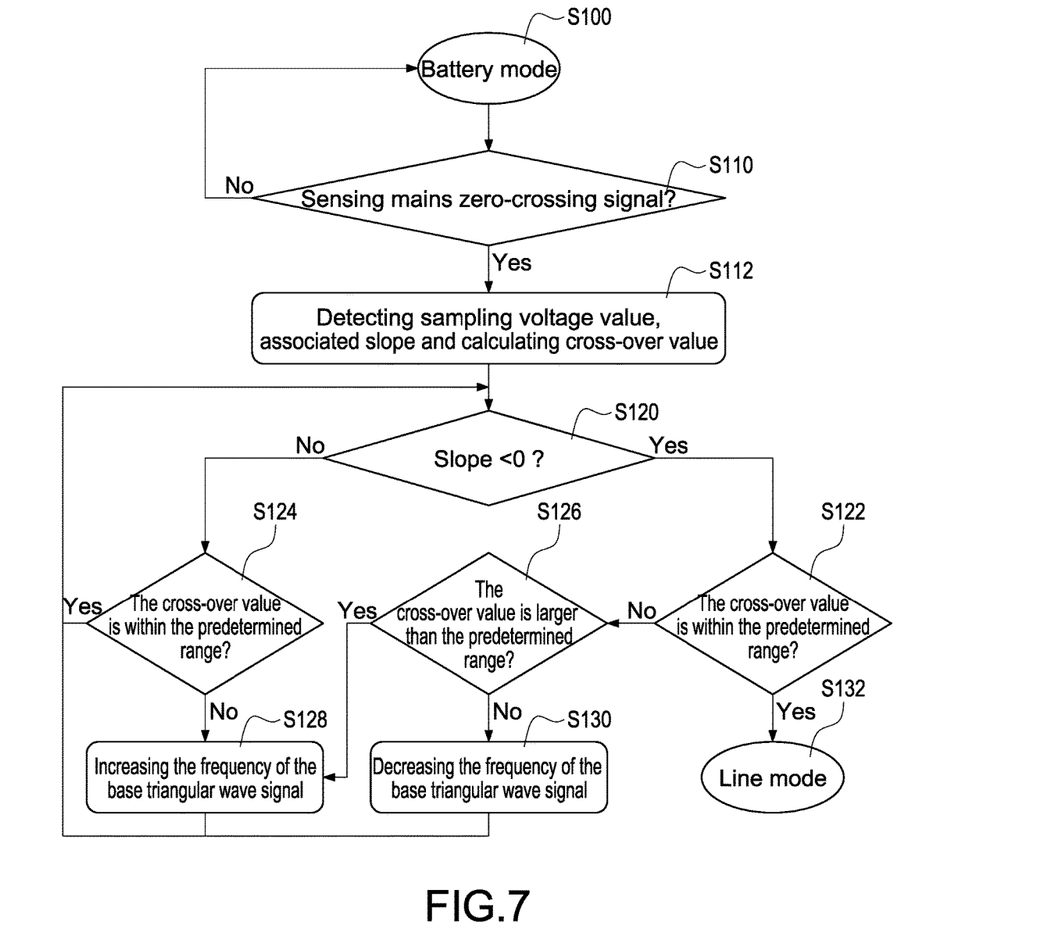
FIG. 7 is a flowchart showing the uninterruptible power system switching from battery mode (BM) to line mode (LM).

FIG. 7 is a flowchart showing the uninterruptible power system 100 switched from battery mode BM to line mode LM. With reference also to FIGS. 2~3 and 5, from a battery mode BM (S100), the carrier controller 41 of the control apparatus keeps sensing the mains zero-crossing signal Sz (S110) and determines that the mains voltage Vac is resumed when the mains zero-crossing signal Sz is detected. At this time, the determination unit 414 of the carrier controller 41 determines whether the slope between the sampling voltage value Vs and the cross-over value Vzc is smaller than zero (S112~S120). If the slope is not less than zero and the cross-over value Vzc is not within the predetermined range Cr (S124), the determination unit 414 sends the determination signal Sd (indicating frequency increment) to the frequency adjusting unit 4122 (S128). The uninterruptible power system 100 is still in battery mode BM after step S128. If the slope is less than zero, the determination unit 414 of the carrier controller 41 determines whether the cross-over value Vzc is within the predetermined range Cr (S122). If the cross-over value Vzc is within the predetermined range Cr, the uninterruptible power system 100 is switched to line mode (S132). If the cross-over value Vzc is not within the predetermined range Cr, the determination unit 414 further determines whether the cross-over value Vzc is larger than the predetermined range Cr (S126). If the cross-over value Vzc is larger than the predetermined range Cr, the determination unit 414 sends the determination signal Sd (indicating frequency increment) to the frequency adjusting unit 4122 (S128). The uninterruptible power system 100 is still in battery mode BM after step S128. If the cross-over value Vzc is less than the predetermined range Cr, the determination unit 414 sends the determination signal Sd (indicating frequency decrement) to the frequency adjusting unit 4122 (S130). The uninterruptible power system 100 is still in battery mode BM after step S130.

Figure 8:
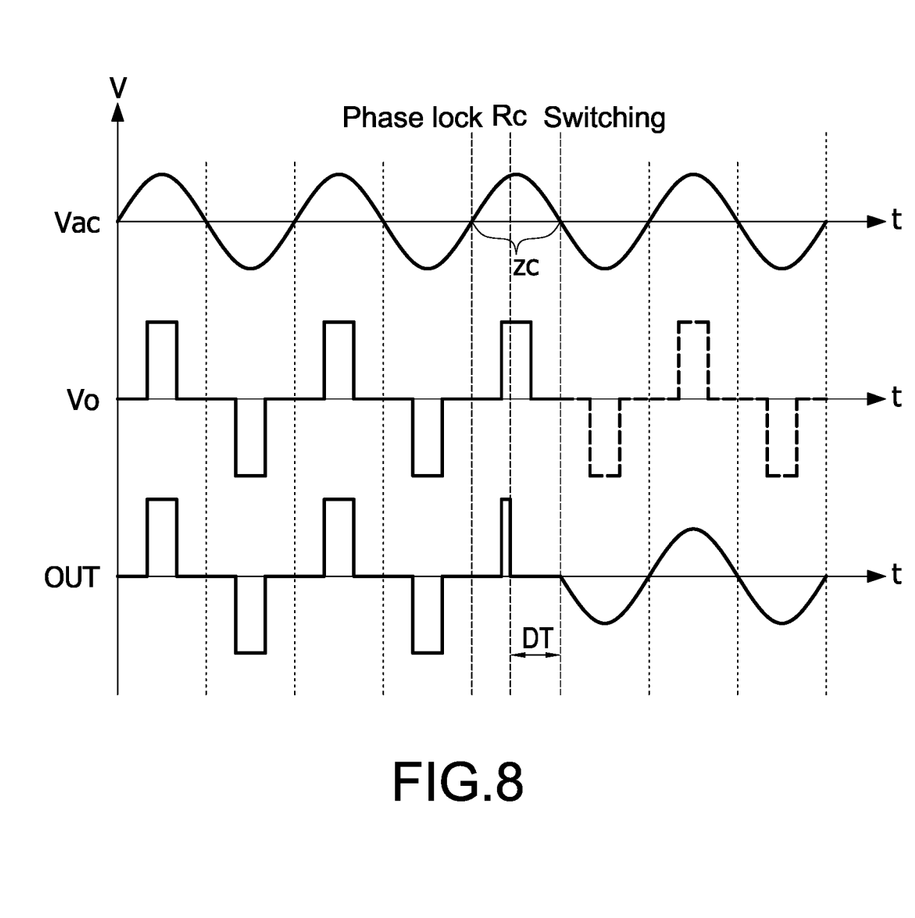
FIG. 8 shows waveforms of the uninterruptible power system according to another embodiment, wherein a delay time is present in the switch unit.

FIG. 8 shows the waveforms of the uninterruptible power system 100 according to another embodiment, wherein a delay time is present in the switch unit. With reference also to FIGS. 2 and 3, when the uninterruptible power system 100 is switched from the battery mode BM to the line mode LM, and the control apparatus 4 sends the switch control signal Rc to the switch unit 3, a delay time DT is present in the switch unit 3. As a result, the switch unit 3 will switch from the battery mode BM to the line mode LM after the delay time DT and the uninterruptible power system 100 cannot be switched at the mains zero-crossing point zc and the switch unit 3 suffers larger mains voltage Vac. In this embodiment, the switch controller 423 has a built-in switch delay time table 4231, which is dependent on the types of the switch unit 3. Before the uninterruptible power system 100 is to be switched from the battery mode BM and resumed to line mode LM, the switch controller 423 provides the delay time DT, according to the type of the switch unit 3 and the switch delay time table 4231, to the switch unit 3. The switch controller 423 switches the switch unit 3 in advance by the delay time DT. As shown in FIG. 8, after the mains voltage Vac is resumed, the uninterruptible power system 100 is to be switched from the battery mode BM to the line mode LM if the slope of the base triangular wave signal Sc is less than zero and the cross-over value Vzc is within the predetermined range Cr. The actual switch time is half period (of the triangular wave) delay from the phase lock time (at the time the determination unit determines that the base triangular wave signal Sc is less than zero and the cross-over value Vzc is within the predetermined range Cr). However, the switch controller 423 sends the switch control signal Rc to the switch unit 3 in advance by the delay time DT to take the delay time of the switch unit in consideration. Therefore the switch unit 3 can achieve zero cross switching at the mains zero-crossing point zc when the uninterruptible power system 100 is switched from the battery mode BM to the line mode LM.

To sum up, one or more embodiments of the present invention have at least one of the following advantages:

1. The phase lock control for the uninterruptible power system can be realized and the instantaneous short circuit in switching can be prevented. The uninterruptible power system has simple implementation and wide application.

2. The control apparatus can sense the right time point for in-phase switching. A delay time is introduced for actual switching such that the uninterruptible power system can achieve zero cross switching at the mains zero-crossing point of the mains voltage, thus preventing the damage due to excess switching stress.

Thus, particular embodiments have been described. Other embodiments are within the scope of the following claims. For example, the actions recited in the claims may be performed in a different order and still achieve desirable results.

What is claimed is:

1. An uninterruptible power system operable in a line mode or a battery mode, the uninterruptible power system comprising:
    a power conversion apparatus configured to receive a mains voltage and generate an alternating conversion voltage;
    a switch unit configured to receive the mains voltage and the alternating conversion voltage, and to output the mains voltage in the line mode and output the alternating conversion voltage in the battery mode; and
    a control apparatus configured to sense the mains voltage and the alternating conversion voltage, and control the power conversion apparatus and the switch unit,
    wherein the control apparatus is further configured to generate a base triangular wave signal according to the mains voltage in the line mode and determine whether a cross-over value of the base triangular wave signal is within a predetermined range at a zero-crossing point of the mains voltage when the uninterruptible power system is operating in the battery mode and the mains voltage resumes; and
    wherein the control apparatus is further configured to control the switch unit to output the mains voltage instead of the alternating conversion voltage and change the uninterruptible power system from operating in the battery mode to operating in the line mode when the cross-over value of the base triangular wave signal is within the predetermined range at the zero-crossing point of the mains voltage.

2. The uninterruptible power system of claim 1, wherein the predetermined range comprises a tolerance range from a middle value of the base triangular wave signal.

3. The uninterruptible power system of claim 1, wherein in the line mode, the control apparatus configured to generate the base triangular wave signal with middle values corresponding to rising-edge zero-crossing points and falling-edge zero-crossing points of the mains voltage, and wherein the control apparatus is configured to control the power conversion apparatus to output the alternating conversion voltage having same frequencies, peaks and valleys as the mains voltage when the uninterruptible power system changes from the line mode to the battery mode.

4. The uninterruptible power system of claim 1, wherein the control apparatus is further configured to adjust a frequency of the base triangular wave signal when the control apparatus determines that the cross-over value of the base triangular wave signal is not within the predetermined range at the zero-crossing point of the mains voltage.

5. The uninterruptible power system of claim 4, wherein the control apparatus is further configured to decrease the frequency of the base triangular wave signal when the base triangular wave signal has falling edge and the cross-over value of the base triangular wave signal is smaller than the predetermined range at the zero-crossing point of the mains voltage.

6. The uninterruptible power system of claim 4, wherein the control apparatus is further configured to increase the frequency of the base triangular wave signal when the base triangular wave signal has falling edge and the cross-over value of the base triangular wave signal is larger than the predetermined range at the zero-crossing point of the mains voltage, or when the base triangular wave signal has rising edge and the cross-over value of the base triangular wave signal is not within the predetermined range at the zero-crossing point of the mains voltage.

7. The uninterruptible power system of claim 1, wherein the control apparatus comprises:
    a carrier controller configured to receive the mains voltage and generate the base triangular wave signal and a switch triggering signal; and
    a pulse controller configured to receive the alternating conversion voltage and the switch triggering signal, and output a pulse width modulation (PWM) signal and a switch control signal, wherein the power conversion apparatus is controllable by the PMW signal and the switch unit is controllable by the switch control signal.

8. The uninterruptible power system of claim 7, wherein the pulse controller further comprises:
   a feedback controller configured to receive the alternating conversion voltage and output a conversion control voltage signal; and
   a pulse width modulation (PWM) unit configured to receive the base triangular wave signal and the conversion control voltage signal, and generate the PWM signal for output in the battery mode.

9. The uninterruptible power system of claim 7, wherein the carrier controller further comprises:
   a mains sensing unit configured to receive the mains voltage and generate a mains zero-crossing signal according to the mains zero-crossing point of the mains voltage;
   a carrier generator configured to receive the mains zero-crossing signal and output the base triangular wave signal;
   a base triangular wave voltage sampling unit configured to receive the base triangular wave signal and output a sampling voltage value; and
   a determination unit configured to receive the mains zero-crossing signal and the sampling voltage value, and output a determination signal to the carrier generator and output the switch triggering signal,
   wherein the determination unit is further configured to determine whether the cross-over value of the base triangular wave signal is within the predetermined range at zero-crossing point of the mains voltage.

10. The uninterruptible power system of claim 9, wherein the carrier generator further comprises
   a frequency adjusting unit configured to receive the determination signal and output a frequency adjusting signal; and
   a carrier count resetting unit configured to receive the mains zero-crossing signal and the frequency adjusting signal, and output the base triangular wave signal,
   wherein the frequency adjusting unit is further configured to adjust a frequency of the base triangular wave signal according to the determination signal when the uninterruptible power system changes from the battery mode to the line mode.

11. The uninterruptible power system of claim 7, wherein the pulse controller further comprises a switch controller configured to receive the switch triggering signal and generate a switch control signal for controlling the switch unit.

12. The uninterruptible power system of claim 11, wherein the switch controller further comprises a switch delay time table comprising a delay time according to a type of the switch unit, the switch controller being configured to switch the switch unit with reference to the delay time when the uninterruptible power system changes from the battery mode to the line mode.

13. A control apparatus for an uninterruptible power system operated in a line mode or a battery mode, the control apparatus comprising:
   a carrier controller for receiving a mains voltage and generating a base triangular wave signal and a switch triggering signal; and
   a pulse controller for receiving an alternating conversion voltage output from a power conversion apparatus and receiving the switch triggering signal, the pulse controller being configured to generate a pulse width modulation (PWM) signal for controlling the power conversion apparatus and generating a switch control signal for controlling a switch unit,
   wherein the control apparatus generates the base triangular wave signal according to the mains voltage in the line mode;
   wherein the control apparatus is configured to determine if a cross-over value of the base triangular wave signal is within a predetermined range at a zero-crossing point of the mains voltage when the uninterruptible power system is operated in the battery mode and the mains voltage resumes, and
   wherein the control apparatus is further configured to control the switch unit to output the mains voltage instead of the alternating conversion voltage when the cross-over value of the base triangular wave signal is within the predetermined range at the zero-crossing point of the mains voltage.

14. The control apparatus of claim 13, wherein the pulse controller further comprises:
   a feedback controller for receiving the alternating conversion voltage and outputting a conversion control voltage signal; and
   a pulse width modulation (PWM) unit for receiving the base triangular wave signal and the conversion control voltage signal, and generating the PWM signal, and
   wherein the PWM unit is configured to output the PWM signal in the battery mode.

15. The control apparatus of claim 13, wherein the predetermined range is a tolerance range from a middle value of the base triangular wave signal.

16. The control apparatus of claim 13, wherein in the line mode, the control apparatus is configured to generate the base triangular wave signal with middle values corresponding to rising-edge zero-crossing points and falling-edge zero-crossing points of the mains voltage, and wherein the control apparatus is configured to control the power conversion apparatus to output the alternating conversion voltage having same frequencies, peaks and valleys as the mains voltage when the uninterruptible power system changes from the line mode to the battery mode.

17. The control apparatus of claim 13, wherein the carrier controller further comprises:
   a mains sensing unit for receiving the mains voltage and generating a mains zero-crossing signal according to the mains zero-crossing point of the mains voltage;
   a carrier generator configured to receive the mains zero-crossing signal and output the base triangular wave signal;
   a base triangular wave voltage sampling unit configured to receive the base triangular wave signal and output a sampling voltage value; and
   a determination unit configured to receive the mains zero-crossing signal and the sampling voltage value and output a determination signal to the carrier generator and output the switch triggering signal,
   wherein the determination unit is configured to determine whether the cross-over value of the base triangular wave signal is within the predetermined range at the zero-crossing point of the mains voltage.

18. The control apparatus of claim 17, wherein the carrier generator further comprises:
   a frequency adjusting unit configured to receive the determination signal and output a frequency adjusting signal; and
   a carrier count resetting unit configured to for receive the mains zero-crossing signal and the frequency adjusting signal and output the base triangular wave signal, wherein the frequency adjusting unit is configured to adjust a frequency of the base triangular wave signal according to the determination signal when the uninterruptible power system changes the battery mode to the line mode.

19. The control apparatus of claim 13, wherein the control apparatus further comprises a switch controller configured to receive the switch triggering signal and generate a switch control signal for controlling the switch unit.

20. The control apparatus of claim 19, wherein the switch controller further comprises a switch delay time table, the switch delay time table being configured to provide a delay time according to a type of the switch unit; and wherein the switch controller switches the switch unit with reference to the delay time when the uninterruptible power system changes from the battery mode to the line mode.

21. The control apparatus of claim 13, configured to adjust a frequency of the base triangular wave signal if the cross-over value of the base triangular wave signal is not within a predetermined range at the zero-crossing point of the mains voltage.

22. The control apparatus of claim 21, wherein the control apparatus is configured to decrease the frequency of the base triangular wave signal when the base triangular wave signal has falling edge and the cross-over value of the base triangular wave signal is smaller than the predetermined range at the zero-crossing point of the mains voltage.

23. The control apparatus of claim 21, further configured to increase the frequency of the base triangular wave signal if:
the base triangular wave signal has falling edge and the cross-over value of the base triangular wave signal is larger than the predetermined range at the zero-crossing point of the mains voltage; or
the base triangular wave signal has rising edge and the cross-over value of the base triangular wave signal is not within the predetermined range at the zero-crossing point of the mains voltage.

24. A method of controlling an uninterruptible power system, the method comprising:
(a) providing the uninterruptible power system operable in a line mode or a battery mode;
(b) receiving a mains voltage by the uninterruptible power system operating in the line mode;
(c) generating a base triangular wave signal according to the mains voltage;
(d) generating an alternating conversion voltage according to the mains voltage;
(e) operating the uninterruptible power system in the battery mode and outputting the alternating conversion voltage;
(f) receiving a resumed mains voltage by the uninterruptible power system;
(g) determining if a cross-over value of the base triangular wave signal is within a predetermined range at a zero-crossing point of the resumed mains voltage; and
(h) outputting the resumed mains voltage instead of the alternating conversion voltage when the cross-over value of the base triangular wave signal is within the predetermined range at zero-crossing point of the resumed mains voltage.

25. The method of claim 24, further comprising:
(i) providing a switch delay time table comprising a switch delay time; and
(j) switching the uninterruptible power system, according to the switch delay time, from operating in the battery mode to operating in the line mode.

26. The method of claim 24, wherein:
the base triangular wave signal is generated with middle values corresponding to rising-edge zero-crossing points and falling-edge zero-crossing points of the mains voltage; and wherein
the alternating conversion voltage comprises a same frequencies, peaks and valleys as the mains voltage.

27. The method of claim 24, wherein the predetermined range is a tolerance range of a middle value of the base triangular wave signal.

28. The method of claim 24, further comprising:
(k) adjusting a frequency of the base triangular wave signal if the cross-over value of the base triangular wave signal is not within the predetermined range.

29. The method of claim 28, wherein the step (k) further comprises:
(k1) decreasing the frequency of the base triangular wave signal if the base triangular wave signal has a falling edge and the cross-over value of the base triangular wave signal is smaller than the predetermined range;
(k2) increasing the frequency of the base triangular wave signal if the base triangular wave signal has a falling edge and the cross-over value of the base triangular wave signal is larger than the predetermined range; and
(k3) increasing the frequency of the base triangular wave signal if the base triangular wave signal has a rising edge and the cross-over value of the base triangular wave signal is not within the predetermined range.

30. The method of claim 24, further comprising:
providing a switch unit for switching the uninterruptible power system to the line mode or the battery mode;
providing a power conversion apparatus for generating the alternating conversion voltage;
providing a carrier controller for generating the base triangular wave signal and a switch triggering signal;
providing a pulse controller for receiving the alternating conversion voltage, the base triangular wave signal, and the switch triggering signal;
outputting, by the pulse controller, a pulse width modulation (PWM) signal and a switch control signal;
controlling the power conversion apparatus using the PMW signal; and
controlling the switch unit using the switch control signal.

31. The method of claim 30, wherein the pulse controller further comprises:
a feedback controller for receiving the alternating conversion voltage and outputting a conversion control voltage signal; and
a pulse width modulation (PWM) unit for receiving the base triangular wave signal and the conversion control voltage signal, and generating the PWM signal,
and wherein the method further comprising outputting, by the PWM unit, the PWM signal when the uninterruptible power system is operating in the battery mode.

32. The method of claim 30, further comprising:
providing a switch controller;
receiving, by the switch controller, the switch triggering signal; and
generating, by the switch controller, the switch control signal for controlling the switch unit.

33. The method of claim 30, further comprising:
providing a mains sensing unit for receiving the mains voltage and generating a mains zero-crossing signal according to the mains zero-crossing point;
providing a carrier generator for receiving the mains zero-crossing signal and outputting the base triangular wave signal;

providing a base triangular wave voltage sampling unit for receiving the base triangular wave signal and outputting a sampling voltage value; and providing a determination unit for receiving the mains zero-crossing signal and the sampling voltage value and outputting a determination signal to the carrier generator and outputting the switch triggering signal, wherein the determination unit is configured to determine if the cross-over value of the base triangular wave signal is within the predetermined range at the zero-crossing point.

34. The method of claim 33, further comprising:

providing a frequency adjusting unit for receiving the determination signal and outputting a frequency adjusting signal;

providing a carrier count resetting unit for receiving the mains zero-crossing signal and the frequency adjusting signal, and outputting the base triangular wave signal; and adjusting, by the frequency adjusting unit, a frequency of the base triangular wave signal according to the determination signal when the uninterruptible power system changes from operating in the battery mode to operating in the line mode.

* * * * *